E. L. CLARK.
BATTERY TESTER.
APPLICATION FILED MAR. 9, 1915.

1,231,708.

Patented July 3, 1917.

WITNESSES:
Alice Clymonts
H. G. Grover

INVENTOR.
EMERSON L. CLARK
BY Ira J. Adams
ATTORNEY

UNITED STATES PATENT OFFICE.

EMERSON L. CLARK, OF LAKEWOOD, OHIO, ASSIGNOR, BY MESNE ASSIGNMENTS, TO NATIONAL CARBON COMPANY, INC., A CORPORATION OF NEW YORK.

BATTERY-TESTER.

1,231,708.　　　　Specification of Letters Patent.　　Patented July 3, 1917.

Original application filed April 26, 1913, Serial No. 763,715. Divided and this application filed March 9, 1915. Serial No. 13,149.

*To all whom it may concern:*

Be it known that I, EMERSON L. CLARK, a citizen of the United States, residing at Lakewood, in the county of Cuyahoga and State of Ohio, have invented a certain new and useful Improvement in Battery-Testers, of which the following is a full, clear, and exact description.

This invention relates to a device for testing batteries, and is adapted particularly to be used in connection with dry cells.

One object of this invention is to construct a reliable battery tester of new design at low cost.

Another object is to secure an instrument which will indicate if a battery is up to a certain definite standard by means of an audible signal or by the sense of touch.

A further object is to provide an instrument that is adjustable and which will not operate below a definite value.

Other objects will appear in the appended description in which.

Figure 1:
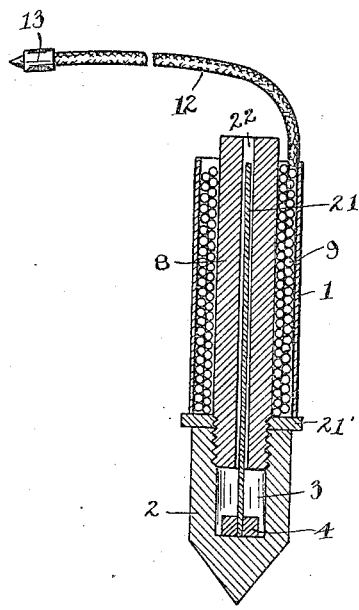
Figure 1 is a cross section of the battery tester.

Referring to Fig. 1, the tester consists of a cylindrical inclosing tube 1 formed preferably of some non-magnetic conducting metal such as brass, and of small diameter, say about ⅜″ to ½″, so that the instrument can be conveniently carried in the pocket. Within the tube the elements of the tester are placed as hereinafter described. A hollow contact or terminal 2 made of non-magnetic conducting material has a chamber or recess 3 therein and a soft iron plunger or armature 4 is placed in the chamber. A pin 21 is attached to the plunger 4 and passes through a central hole 22 longitudinally extending through a core member 8, so that when the plunger is raised, the pin 21 extends through the member and strikes the finger placed over the opening. The end of the pin 21 can also be seen when the plunger is raised and hence it can indicate that the plunger has been raised. The adjustment between the core 8 and contact 2 can be secured by adding non-magnetic washers 21′.

Figure 2:
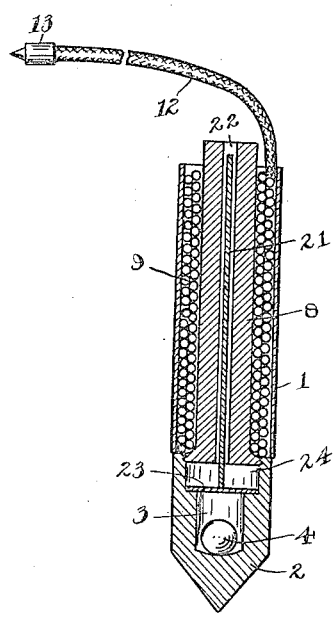
Fig. 2 is a cross section of a slightly different form of battery tester.

The instrument shown in Fig. 2 is of the same type as that of Fig. 1, the difference being in the manner of operating the pin. The lower end of the pin 21, which is preferably of non-magnetic material, is attached to the head 23 moving loosely in a recess 24 of a larger diameter than the lower recess 3 in which the armature 4 operates. The opening 24 is closed by the threaded end of the member 8 as in the preceding figure.

Figure 4:
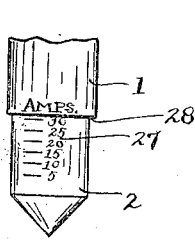
Fig. 4 is another type of scale for use on the battery testers shown.
Figure 3:
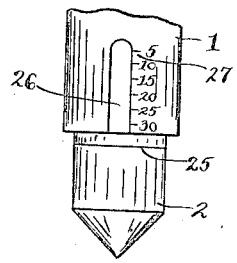
Fig. 3 is a partial view showing a suitable scale for indicating the adjustment.
Figure 5:
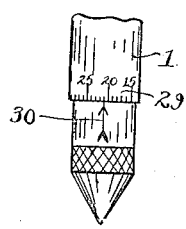
Fig. 5 is a somewhat different scale for use similar to those of Figs. 3 and 4.

Figs. 3, 4 and 5 illustrate three typical scales for indicating the current required to operate the instrument. In the form shown in Fig. 3, the indicator 25 is a circular line or groove cut around the contact member 2. This guide line is visible through a slot 26 cut in the cylinder 1, and a longitudinal scale 27 is marked on the cylinder at the edge of the slot. The scale may be calibrated to indicate the point at which the magnet picks up for the various currents. In Fig. 4 the scale 27 is marked on the contact member 2 and the base line 28 of the tube serves as the zero line. In Fig. 5, the scale 29 is marked around the lower edge of the inclosing cylinder, and an arrow 30 serves as the zero line. This form of scale is adapted for instruments in which the vertical distance, through which the contact 2 is moved for a given variation of current, is small. Any of these forms can be used on the battery testers of Figs. 1 and 2, and other forms will also be suitable, those shown being merely illustrative.

The operation of the instruments of Figs. 1 and 2 is essentially the same, as is also the manner of adjustment. In Fig. 1, when the terminals 2 and 13 are applied to the terminals of a battery, the coil 9 will magnetize the core 8 which attracts the plunger 4 and raises the pin or indicating means so that its end extends out of the member 8. The operator, by placing his finger over the upper end of the tester, will feel the impact of the pin and know that the armature has picked up. If the armature sticks to the core on account of residual magnetism, it can be pushed away by manipulating the pin.

The instruments can be set to operate above a certain value, say 6 amperes, and then used to tell whether a cell should be discarded or not. If the armature picks up it will be known that the cell is all right. If it does not pick up the cell can be discarded as depleted. The instruments, however, are preferably made with adjustable scales as in Figs. 3, 4 and 5, so that the operator, in testing a battery, would adjust the contact piece from high readings to lower ones until the click or impact indicates that the armature has been picked up. The value of the current can then be read on the scale. This value is the current that the battery can produce on short circuit, for the winding on the coil can be made to have negligible resistance. The tester can also be wound to take a small current and by proper calibration it will indicate the voltage.

In all of the battery testers shown, the shape of the armature and inclosing tube is, of course, immaterial, and likewise the type of indicating scale.

This case is a division of my co-pending application, Serial No. 763,715, filed April 26, 1913.

Having described my invention, what I claim is:

1. A battery tester consisting of a hollow metallic member, a coil of wire wound thereon, a hollow head having a contact point and secured to said metallic member and electrically connected to the coil, an armature or plunger in the head, an indicating device extending through said member adapted to be moved when the armature or plunger is attracted by the coil, and a flexible terminal electrically connected with the other end of the coil.

2. A battery tester consisting of a hollow core of magnetic material, a coil of wire wound thereon, a contact piece secured to the end of said core and electrically connected with one end of the coil, an armature or plunger adapted to be moved by the field produced by a current traversing the coil, and an indicating device extending through said core adapted to be moved by said armature or plunger.

3. A battery tester consisting of a hollow iron core, a coil of wire wound thereon, a head of non-magnetic material secured to said core, a non-magnetic rod extending loosely through said core and into said head, an armature in the head spaced from the end of said rod, said armature adapted to move said rod when moved through the influence of the magnetic field of said coil.

4. A battery tester consisting of a hollow iron core, a coil of wire wound thereon, a head of non-magnetic material secured to the end of said core, a non-magnetic rod extending through said core and into the head, a disk secured to said rod and an armature in said head spaced from said disk.

In testimony whereof, I hereunto affix my signature in the presence of witnesses.

EMERSON L. CLARK.

Witnesses:
S. H. FLEMING,
H. G. GROVER.

Copies of this patent may be obtained for five cents each, by addressing the "Commissioner of Patents, Washington, D. C."